UNITED STATES PATENT OFFICE.

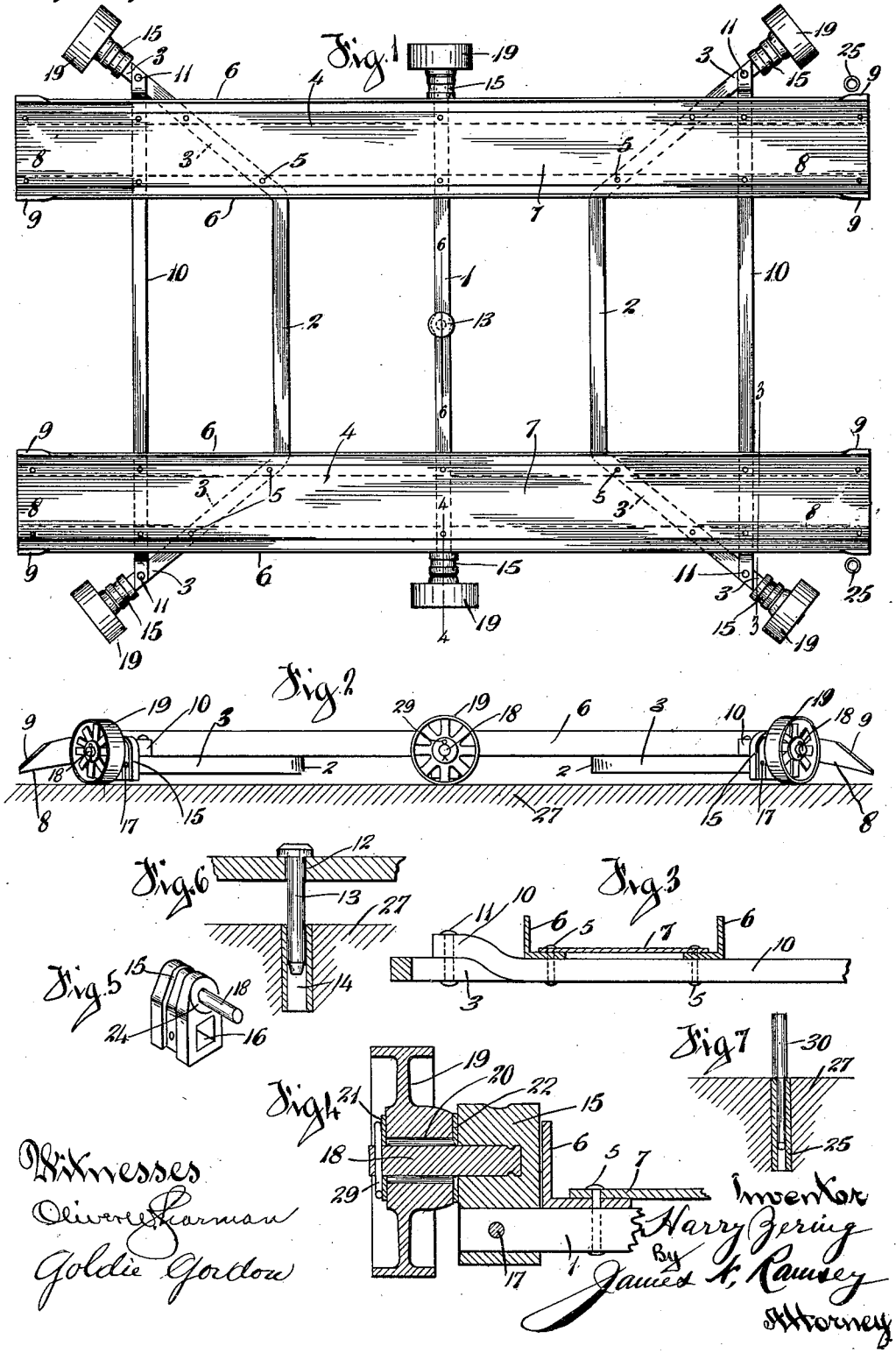

HARRY ZERING, OF CINCINNATI, OHIO.

TRUCK TURN-TABLE.

1,005,495.  Specification of Letters Patent.  Patented Oct. 10, 1911.

Application filed July 21, 1911. Serial No. 639,791.

*To all whom it may concern:*

Be it known that I, HARRY ZERING, a citizen of the United States, residing at Cincinnati, in the county of Hamilton and State of Ohio, have invented certain new and useful Improvements in Truck Turn-Tables, of which the following is a specification.

My invention relates to improvements in truck turn tables, and is especially adapted for use in turning automobiles in private garages where the space is limited.

The object of my invention is to provide a simple, convenient, efficient and easily operated truck turn table which can be quickly and easily moved to and used in any part of the building without the use of a track, pit, rail, guide-way or other similar means mounted upon or secured to the flooring or foundation, or without digging up the foundation, or marring the floor for such purposes, and without raising the vehicle but slightly above the level of the surrounding floor.

Other objects of my invention and its advantages will be apparent and will be set forth.

My invention consists in a truck turn table comprising a body or platform mounted upon wheels each having its diameter placed at right angles to a line radiating from a common center of said truck turn table.

My invention also consists in the peculiar construction, combination and arrangement of the several parts as herein set forth and claimed.

In the accompanying drawing which serves to illustrate the construction of my invention: Figure 1 is a plan view; Fig. 2 is a side elevation; Fig. 3 is a view partly in elevation and partly in section on the line 3—3 of Fig. 1; Fig. 4 is a vertical section on the line 4—4 of Fig. 1; Fig. 5 is a perspective view of the axle support and axle; Fig. 6 is a vertical sectional view on the line 6—6 of Fig. 1 showing the king bolt in position in the middle axle bar, and in the socket; and Fig. 7 is a vertical section showing a floor socket and pin for holding the turn table from turning while a truck is being run on or off of the turn table.

In the embodiment of my invention as illustrated, and which shows a preferred construction, 1 represents the middle axle bar which extends transversely of the turn table and 2 represents the end axle bars which also extend transversely of the turn table except at their ends 3, which ends 3 extend at an angle to the central part of said end axle bars on lines radiating from a common center of said turn table. Upon these axle bars I mount wheel treads, tracks or floor 4, which extend across said axle bars and are secured thereto by rivets 5, or they may be securely bolted thereto. These wheel treads or tracks 4, are each preferably constructed of two angle irons 6, spaced apart and riveted to a metal plate 7, thus forming flanged wheel treads or tracks which prevent the wheels of the truck from getting off of the track.

I preferably provide the wheel treads with curved ends 8 which extend downwardly toward the floor or foundation to provide an incline on which the vehicle may more readily and easily mount the track.

I also prefer to form flaring flanges 9 on the angle iron 6 at the ends of the track to prevent the wheels of the vehicle as it is being driven upon the track from coming into contact with any sharp edges which would damage the wheel and also to widen the track and make it easier to guide the vehicle upon the turn table.

In order to strengthen and brace the ends of the turn table I preferably provide supporting brace bars 10 which extend transversely across the turn table beneath the wheel treads or track 4, and which are connected to the angular ends 3, of the end axle bars 2, being curved upwardly at their ends and secured thereto by rivets or bolts 11, as clearly shown in Fig. 3.

The middle axle bar 1, is preferably enlarged at its center, and is provided with a vertical hole 12, through such enlargement to receive a king bolt 13, which is adapted to extend into a socket or opening 14 in the floor or foundation 27 upon which the turn table is placed.

Upon the projecting end of each axle bar I mount an axle support 15, which is preferably provided with an angular shaped hole 16, to receive the angular end of the axle bar to which it is secured by a bolt 17 which extends transversely through said axle support and bar. This axle support preferably extends upwardly and is provided with an axle 18 extending outwardly therefrom and suitably secured thereto, either in the manner shown or otherwise as desired. The axle support is provided in order that the axle may be placed sufficiently high to allow the tracks to be brought near enough to the floor or foundation, to permit a truck to be driven thereon and the height of the axle support may be varied, depending upon the size of wheel used. I mount a wheel 19 upon each axle, preferably upon common roller bearings 20, between washers 21 and 22, and secure the wheels thereto by means of a spring cotter 29, but any form of bearing may be used, such as ball bearings or plain bearings.

The axle support 15, is preferably provided with a boss 24 surrounding the end of the axle 18 where it connects to the axle support 15.

The socket 14 may consist of a tube embedded in the floor or foundation and formed flush with the surface thereof so that when the king bolt is removed the turn table may readily be moved to any place desired, having no projection or depression in the floor space which may be used immediately for other purposes without making any changes therein. I also preferably provide suitable sockets 25, in the floor or foundation, adjacent and outside of the wheel treads at one end of the turn table within which stay bolts 30 may be placed to hold the turn table from turning while the truck is being run on or off of the turn table, or while it is in position thereon, said stay bolts being removed only when it is desired to turn the table.

While I have shown and described my invention as being preferably provided with a central king bolt to engage a socket in the floor this is not absolutely necessary for the reason that the wheels 19 being mounted upon axles which all radiate on lines extending from the common center of said turn table, said wheels when the turn table is pushed or pulled, will travel in circular directions around said common center. The outer wheels, or those farthest from the center, will move in a given circle and the other wheels, which are placed nearer to the center, will move in circles concentric to the circles traversed by the outer wheels so that when said turn table is moved, without being anchored by a king bolt or otherwise, it will substantially rotate upon its center and vary or shift its position upon the floor very slightly, but where the floor is limited, and there is not room for any shifting it is preferable to use a king bolt and when the king bolt is used there is comparatively little stress or wear thereon for the reason, as above stated, that the turn table having wheels disposed to travel in circles it will naturally rotate upon the common center. Thus it will be seen that an important advantage of my invention is the construction and arrangement which permits the turn table to move or rotate in a circular direction when being pushed without the necessity of being anchored or in anywise connected to the floor or other parts of the building within which it is placed.

I have shown my turn table as being provided with flanged wheel treads or tracks 4, but the flanges may be omitted and the entire turn table may be covered with a suitable floor, if preferred.

While I have shown the wheel treads as constructed of metal it will be apparent that wood or other suitable material may be used, if desired, and this would result in making the turn table lighter than when constructed entirely of metal.

As heretofore stated, my turn table is especially adapted for use in garages, and especially in private garages which are placed in the rear end of lots which slope to the street, and render it dangerous or difficult for the automobiles to be backed out. It is also very desirable to be able to turn the machine in the garage and start forward in the proper manner from the garage, even when the track does not incline toward the street from the garage.

Furthermore, my invention is well adapted for use in all public garages, or stores, or manufacturing plants where it is desired to place automobiles in any position desired in a narrow building or through various passage ways. In the case of narrow buildings it enables the machines to be run in and turned so that they can be run out instead of being backed out. The turn table not being permanently mounted, its location can be readily changed to suit varying conditions in the arrangement of the machines in manufacturing plants and large garages.

A very important feature of my invention consists in the axle support which allows the axle to be placed at any height from the floor desired so that any size of wheel best adapted for the purpose may be used and at the same time permit the floor or wheel treads to be brought sufficiently near to the surrounding floor upon which it is mounted, to give it proper clearance to turn and permit the vehicle to easily mount the same.

Another feature of my invention is that any number of wheels can be used on axles extending on lines radiating from a common center of said turn table.

It will be apparent that my invention is capable of some modification without departing from the spirit or scope thereof, and I do not, therefore, desire to be limited to the particular construction and arrangement set forth, but

What I claim and desire to secure by Letters Patent is:

1. In a truck turn table, axle bars, an axle support mounted upon the end of each axle bar and extending upwardly therefrom, an axle upon each axle support, and wheels operatively secured upon each axle, and wheel treads mounted upon said axle bars.

2. In a truck turn table, a centrally disposed axle bar, an axle bar on each side of said central axle bar each having its ends extending in a direction corresponding to a line radiating from the center of said middle axle bar, an axle for each axle bar, a wheel upon each axle and a brace bar extending transversely across beneath the wheel treads and connected to said end axle bars.

3. In a truck turn table, a central axle bar extending transversely of the turn table, end axle bars each extending in its central part transversely of said turn table and having its ends extending at an angle to said central part, axles suitably mounted on said axle bars, and wheels operatively secured to said axles.

4. In a truck turn table, axle bars, axles for said axle bars, wheels operatively secured upon said axles, wheel treads mounted upon and secured to said axle bars, a socket arranged in the floor upon the outside of each wheel tread, and a pin adapted to enter each socket, for the purposes specified.

5. In a truck turn table, angular axle bars, wheel treads mounted thereon, axle supports each having an angular hole into which the ends of said axle bars are adapted to fit, a bolt extending transversely through each axle support and angular bar and secured thereto, an axle upon each axle support, and a wheel operatively mounted upon each axle.

HARRY ZERING.

Witnesses:
JAMES N. RAMSEY,
GOLDIE GORDON.

Copies of this patent may be obtained for five cents each, by addressing the "Commissioner of Patents, Washington, D. C."